(12) United States Patent
Langrell et al.

(10) Patent No.: US 11,317,597 B2
(45) Date of Patent: May 3, 2022

(54) LIVESTOCK FORCE TUB WITH SUPPLEMENTAL WALL SECTION, AUXILIARY SPACE AND REDUCED OPACITY EXIT-ADJACENT WALL SECTIONS

(71) Applicant: Northquip Inc., Woodlands (CA)

(72) Inventors: Stephen Arthur Langrell, Woodlands (CA); Philip Malcolm Firth, Woodlands (CA)

(73) Assignee: Northquip Inc., Woodlands (CA)

( * ) Notice: Subject to any disclaimer, the term of this patent is extended or adjusted under 35 U.S.C. 154(b) by 284 days.

(21) Appl. No.: 16/425,636

(22) Filed: May 29, 2019

(65) Prior Publication Data

US 2020/0045927 A1    Feb. 13, 2020

(30) Foreign Application Priority Data

Aug. 7, 2018  (WO) ................ PCT/CA2018/050961

(51) Int. Cl.
| | | |
|---|---|---|
| *A01K 1/00* | (2006.01) | |
| *A01K 3/00* | (2006.01) | |
| *A01K 1/06* | (2006.01) | |

(52) U.S. Cl.
CPC .......... *A01K 1/0029* (2013.01); *A01K 1/0023* (2013.01); *A01K 3/00* (2013.01); *A01K 1/0613* (2013.01)

(58) Field of Classification Search
CPC ....... A01K 1/0029; A01K 1/0023; A01K 3/00
See application file for complete search history.

(56) References Cited

U.S. PATENT DOCUMENTS 3,545,407 A * 12/1970 Moore ..................... A01K 3/00
                                                                119/502
4,275,685 A    6/1981 Hopkins
(Continued)

FOREIGN PATENT DOCUMENTS

WO    2016/176722    11/2016

OTHER PUBLICATIONS

W-W Manufacturing Co. Inc., "270 Sweep System Components". http://www.beavervalleysupply.com/sectionj/wwsystems.htm, Jun. 16, 2018.
(Continued)

*Primary Examiner* — Jessica B Wong
(74) *Attorney, Agent, or Firm* — Kyle R Satterthwaite; Ryan W Dupuis; Ade & Company Inc.

(57) ABSTRACT

A livestock force tub features a perimeter structure delimiting an interior space of said livestock tub, including a main peripheral wall spanning circumferentially around a central upright axis, an exit situated at or proximate a terminal end of the main peripheral wall and a supplemental wall section at an area adjacent the exit on a side thereof opposite the terminal end of the main peripheral wall. The supplemental wall section increases an angular span of the tub around the central axis to create an auxiliary space beyond the exit. This auxiliary space accommodates a possible uncooperative animal during unloading of the force tub while allowing others to still reach the exit. The supplemental wall section and a terminal section of the main peripheral wall have a lesser opacity than more significantly cladded areas of the main peripheral wall, whereby increased light admission and environmental visibility attract livestock toward the exit.

39 Claims, 11 Drawing Sheets

(56) References Cited

U.S. PATENT DOCUMENTS

| | | | |
|---|---|---|---|
| 4,829,936 A | 5/1989 | Mollhagen | |
| 7,174,853 B1 * | 2/2007 | Donaldson | |
| 10,327,416 B1 * | 6/2019 | Studebaker, Jr. | .... A01K 1/0029 |
| 10,653,105 B2 * | 5/2020 | Olsson | ................ A01K 1/0029 |

OTHER PUBLICATIONS

Hi-Hog Farm & Ranch Equipment, "Hi-Hog Product Brochure", https://hi-hog.com, 2017.
Arrowquip, "10' Budflow Tub Double 90 Alley Exit Assembly Instructions", https://arrowquip.com/resources/manuals, 2018.

* cited by examiner

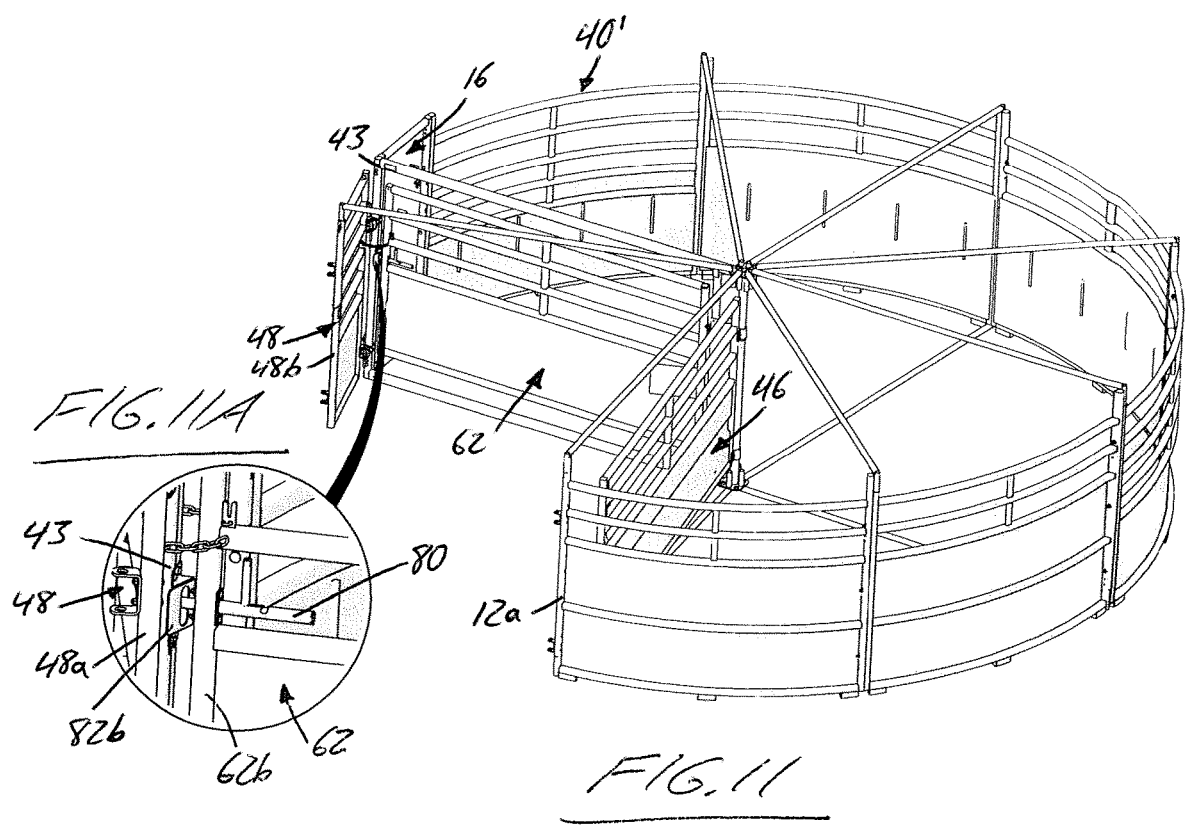
FIG.11A
FIG.11
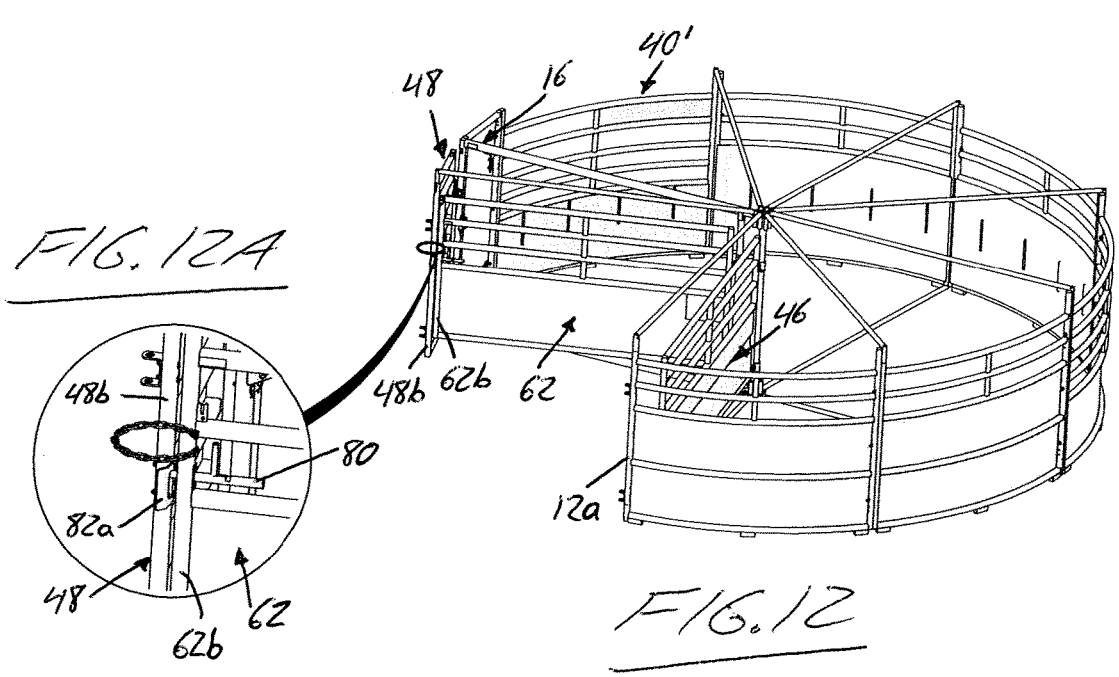
FIG.12A
FIG.12

LIVESTOCK FORCE TUB WITH SUPPLEMENTAL WALL SECTION, AUXILIARY SPACE AND REDUCED OPACITY EXIT-ADJACENT WALL SECTIONS

CROSS-REFERENCE TO RELATED APPLICATIONS

This application claims foreign priority benefit under 35 U.S.C. 119(a) of PCT Application No. PCT/CA2018/050961, filed Aug. 7, 2018, the entirety of which is incorporated herein by reference.

FIELD OF THE INVENTION

The present invention relates generally to livestock handling equipment, and more particularly to force tubs with a main peripheral wall along which a movable barrier is swung to encourage a group livestock toward an exit of single animal width at a terminal end of said wall, where the force tub leads into a single-animal alleyway.

BACKGROUND

Force tubs, also known as crowding tubs or crowding pens, are a well-known tool for funneling a group of cattle, sheep, pigs or other livestock from a larger herd into a single animal alleyway through which such animals can only travel in single file. Examples of such force tubs and other livestock handing equipment similarly using a swinging barrier to encourage animals through an arcuate path along the concave side of main peripheral wall toward an exit at the terminal end of said wall are found in PCT Application WO2016/176722, U.S. Pat. Nos. 4,275,685, 4,829,936 and 7,174,853.

Applicant has been marketing the Budflow™ cattle tub, a unique force tub in which the livestock enter the interior space via an openable/closeable gate situated adjacent to the tub exit at a terminal end of the main peripheral wall, taking advantage of the fact that cattle will naturally tend to turn back toward the point from which they entered an enclosed space. The uniquely positioned gate is initially opened to allow entry of a select quantity of livestock, behind which the gate is closed. The livestock follow the main peripheral wall toward the conventional entrance location at the starting end of the peripheral wall, where the movable barrier panel prevents exit through this end of the tub. The livestock are naturally inclined back toward the point of entry, which is now closed, but beside which the tub exit leading into the alleyway is now open. This uses the livestock's natural inclination to supplement the exit encouragement provided by the operator's swinging of the movable barrier toward the exit.

Despite the improved livestock flow achieved through such operation of the Budflow force tub, there nonetheless remains room for new techniques and designs for improving flow of livestock through the exit of a force tub.

SUMMARY OF THE INVENTION

According to one aspect of the invention, there is provided a livestock force tub comprising:

a perimeter structure spanning circumferentially of an interior space of said livestock tub, said perimeter wall structure comprising:

a main peripheral wall standing upright in a position spanning partially around said interior space in a circumferential direction around a central upright axis; and an exit situated at or proximate a terminal end of said main peripheral wall to enable exit of livestock from said interior space; and a supplemental wall section standing upright at an area adjacent the exit on a side thereof opposite the terminal end of said main peripheral wall.

an entrance through which livestock are admissible to the interior space of said force tub;

a closure residing in, or moveable into, a secured position closing off the interior space of the force tub on a side of the supplementary wall section opposite the exit; and a movable barrier supported for rotational movement around the central upright axis at an inner end thereof and reaching outwardly away from said central axis toward the main peripheral wall to enable swinging of an opposing outer end of said movable barrier along an interior side of said main peripheral wall toward the terminal end thereof to encourage livestock toward the exit.

According to a second aspect of the invention, there is provided a livestock force tub comprising a perimeter structure spanning circumferentially of an interior space of said livestock tub around an upright axis, and an exit by which livestock can depart said interior space, wherein an angular span of said interior space around the upright axis extends past the exit in an unloading direction in which livestock are herded through the exit.

Applicant has found that by installing a supplemental wall section and creating an auxiliary space beside the exit, accommodation is made for an uncooperative animal that may refuse or turn away from the exit during attempted unloading of the force tub. Occupying this auxiliary space, the uncooperative animal no longer obstructs the exit, whereby other cooperative livestock can get by and successfully reach the exit.

According to a third aspect of the invention, there is provided a livestock force tub comprising:

a perimeter structure delimiting an interior space of said livestock tub, said perimeter wall structure comprising:

a main peripheral wall standing upright in a position spanning partially around said interior space in a circumferential direction around a central upright axis; and an exit situated at or proximate a terminal end of said main peripheral wall to enable exit of livestock from said interior space;

an entrance through which livestock are admissible to the interior space of said force tub;

a closure residing in, or moveable into, a secured position closing off the interior space of the force tub on a side of the exit opposite the terminal end of the main peripheral wall; and a movable barrier supported for rotational movement around the central upright axis at an inner end thereof and reaching outwardly away from said central axis toward the main peripheral wall to enable swinging of an opposing outer end of said movable barrier along an interior side of said main peripheral wall toward the terminal end thereof to encourage livestock toward the exit;

wherein said perimeter structure comprises at least one reduced opacity wall section residing adjacent the exit on at least one side thereof, said at least one reduced opacity wall section being of lesser opacity than more opaquely cladded sections of the main peripheral wall that reside further from the exit than said at least one reduced opacity wall section the closure, said at least one reduced opacity wall section also being of lesser opacity than the closure, whereby light admission into the interior space from an external environment and visibility of the external environment from the internal space are greater at one or more areas adjacent the exit compared to other areas of the interior space that are bordered by the by the closure and the more opaquely cladded areas of the main peripheral wall.

Applicant has found that the admission of natural light and visibility of the outside environment at a location beside the tub exit will act to naturally entice the livestock toward the exit more-so than the comparatively dark alleyway into which the exit leads, thus increasing reducing reliance on physical urging of the cattle toward the exit using the movable barrier, and thereby increasing ease of use and safety for the operator.

BRIEF DESCRIPTION OF THE DRAWINGS

Preferred embodiments of the invention will now be described in conjunction with the accompanying drawings in which:

FIG. 11 is an overhead perspective view similar to FIGS. 5 and 8, but illustrating optional securement of a closure panel in a different closed position reducing the tub's interior space to a more conventional shape.

FIG. 11A is a partial closeup of the force tub of FIG. 11, illustrating latched securement of the closure panel.

FIG. 12 is an overhead perspective view of the same force tub of FIG. 11, but illustrating securement of the closure panel in the position of FIGS. 5 and 8 to accomplish inventive expansion of the tub's interior space.

FIG. 12A is a partial closeup of the force tub of FIG. 12, illustrating latched securement of the closure panel.

DETAILED DESCRIPTION

Figure 1:
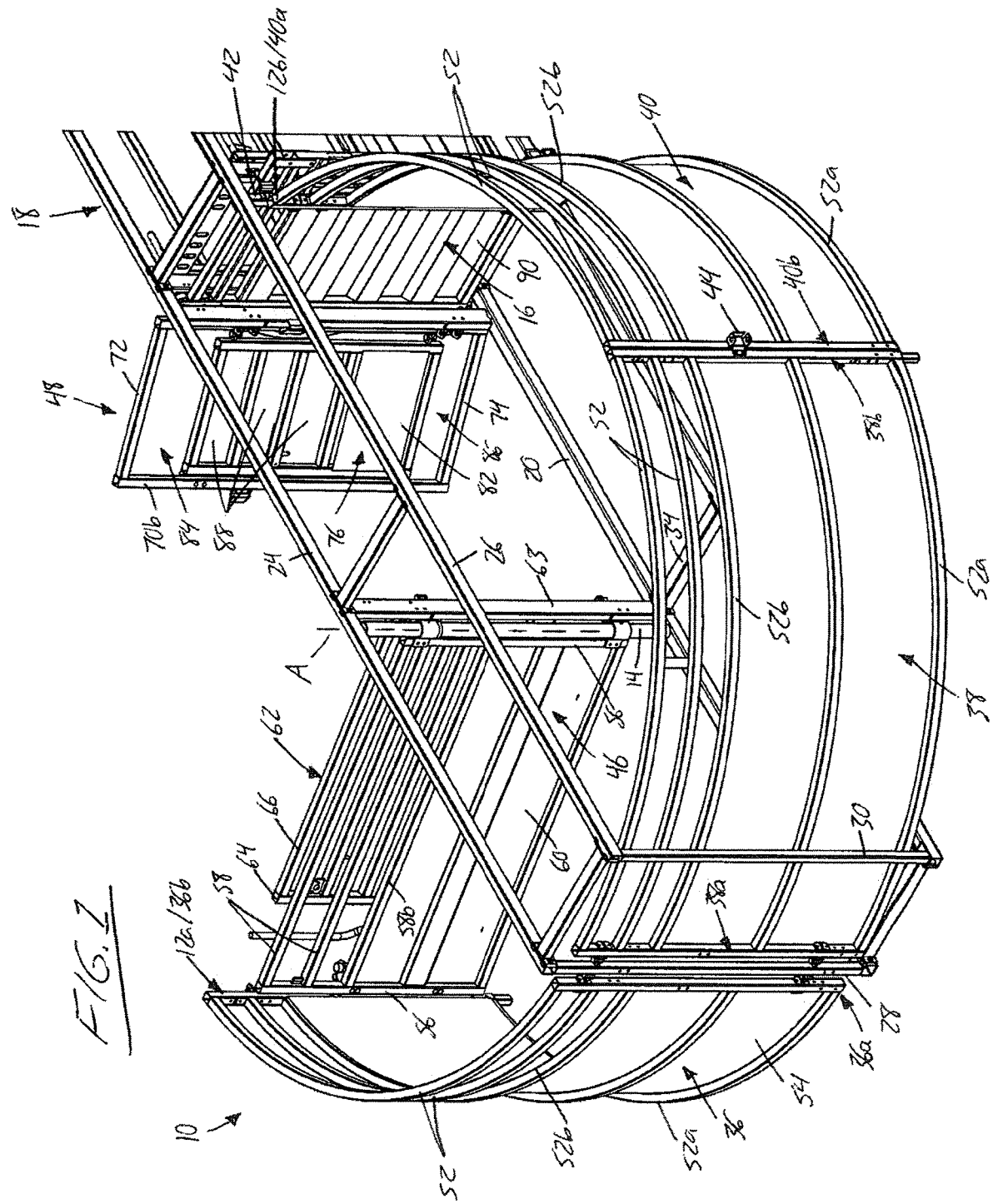
FIG. 1 is an overhead perspective view of a force tub according to a first embodiment of the present invention, as viewed from a first side thereof in an initial loading state enabling entry of livestock thereto.

FIGS. 1 through 6 illustrate a livestock force tub 10 according to a first embodiment of the present invention. The force tub features a main peripheral wall 12 standing vertically upright from the ground and curving a less than full span around a circular path centered on a vertically upright central axis A. A central post 14 stands vertically upright on the central axis A, and the main peripheral wall follows an arcuate path around the central axis A at a uniform radial distance therefrom. The arcuate path spanned by the peripheral wall is at least 180-degrees, and in the illustrated example, somewhere between 180-degrees and 270-degrees. One end of the peripheral wall is referred to herein as the starting end 12a, while the opposing end is referred to herein as the terminal end 12b.

Residing immediately adjacent the terminal end 12b of the peripheral wall 12 is an exit 16 of the force tub that opens into a connected alleyway 18 leading radially outward from the force tub. In the illustrated embodiments, the force tub and the alleyway are parts of a prefabricated mobile livestock handling system that is configurable between a collapsed transport state towable behind a road vehicle, and an expanded working state ready for use. The drawings show the system in its expanded working state ready for use.

In the illustrated embodiments, lower beams 20, 22 of the alleyway reach longitudinally outward therefrom at lower corners of the exit 16 and span across the force tub to an outer side thereof opposite the exit 16. One of these lower beams 20 lies diametrically of the force tub, and therefore passes through the central upright axis and is referred to as a central lower beam. This central lower beam 20 supports the central post 14 of the force tub in a vertical position standing perpendicularly upright from the central lower beam 20. A pair of upper beams 24, 26 lie parallel to the lower beams 20, 22 in aligned and elevated relation thereover, and thus span across the force tub from the upper corners of the exit 16 to the opposing outer side of the force tub. Upright end posts 28, 30 at the outer side of the tub interconnect the lower beams to the upper beams. Near the exit side, outer side and center of the tub, upper and lower cross bars 32, 34 span horizontally between the upper and lower beams, respectively. This assembly of beams posts and cross-bars form a framework for supporting the main peripheral wall and other components of the force tub during transport of the mobile livestock handling system, where this framework is towed from the distal end of the alleyway furthest from the tub and rides in slightly elevated relation above the ground on suitable transport wheels (not shown). However, it will be appreciated from the following description that the principles of the present invention may applied to any force tub, regardless of portability and collaspability.

The main peripheral wall 12 in each illustrated embodiment is made up of a series of arcuate sections each having a concave inner side and a concave outer side. A first peripheral wall section 36 has a proximal end 36a hinged to the upright end post 28 that stands upward from the central lower beam to the overlying central upper beam 24 of the tub framework, and an opposing distal end 36b that defines the starting end 12a of the main peripheral wall 12. The drawings show the first peripheral wall section 36 in its deployed working state where its concave inner side lies circumferentially of the central axis A at a uniform radial distance outward therefrom. To collapse the force tub into its transport state (not shown), the first section 36 can be swung inwardly toward the central axis A about the upright pivot axis of its hinged connection to upright end post 28.

A second peripheral wall section 38 likewise has a proximal end 38a hinged to the same upright end post 28 as the first peripheral wall section, but on an opposing side thereof facing the other upright end post 30. This second peripheral wall section 38, in its deployed position shown in the drawings, continues arcuately around the central upright axis A from the proximal end 36a of the first peripheral wall section 36 at the same uniform radial distance from the central axis A. To collapse the force tub into its transport state, the second section 38 can be swung inwardly toward the central axis A about the upright pivot axis of its hinged connection to upright end post 28.

A third peripheral wall section 40 likewise has a proximal end 40a that is hinged to an upright support, which in this case is an upright frame member 42 at a respective side of the exit 16. This proximal end 40a of the third wall section thus defines the terminal end 12b of the overall peripheral wall. In the deployed position of the third peripheral wall section, it reaches outwardly to the same side of the tub framework as the second peripheral wall section 38, where the distal end 40b of the third section 40 is releasably coupled to the distal end 38b of the second section 38 by a latch 44 having co-operable components respectively carried on the distal ends 38b, 40b of these two sections 38, 40. The concave inner side of the third section 40 resides at the same uniform radial distance form the central axis as the other two sections 36, 38, whereby the main peripheral wall sections 36, 38, 40 situated end-to-end around the central post span a partial circular path of more than 180-degrees but less than 270-degrees in a circumferential direction around the central axis A To collapse the force tub into its transport state, the third section 40 can be swung inwardly toward the central axis about the upright pivot axis of its hinged connection to upright frame member 42.

Figure 2:
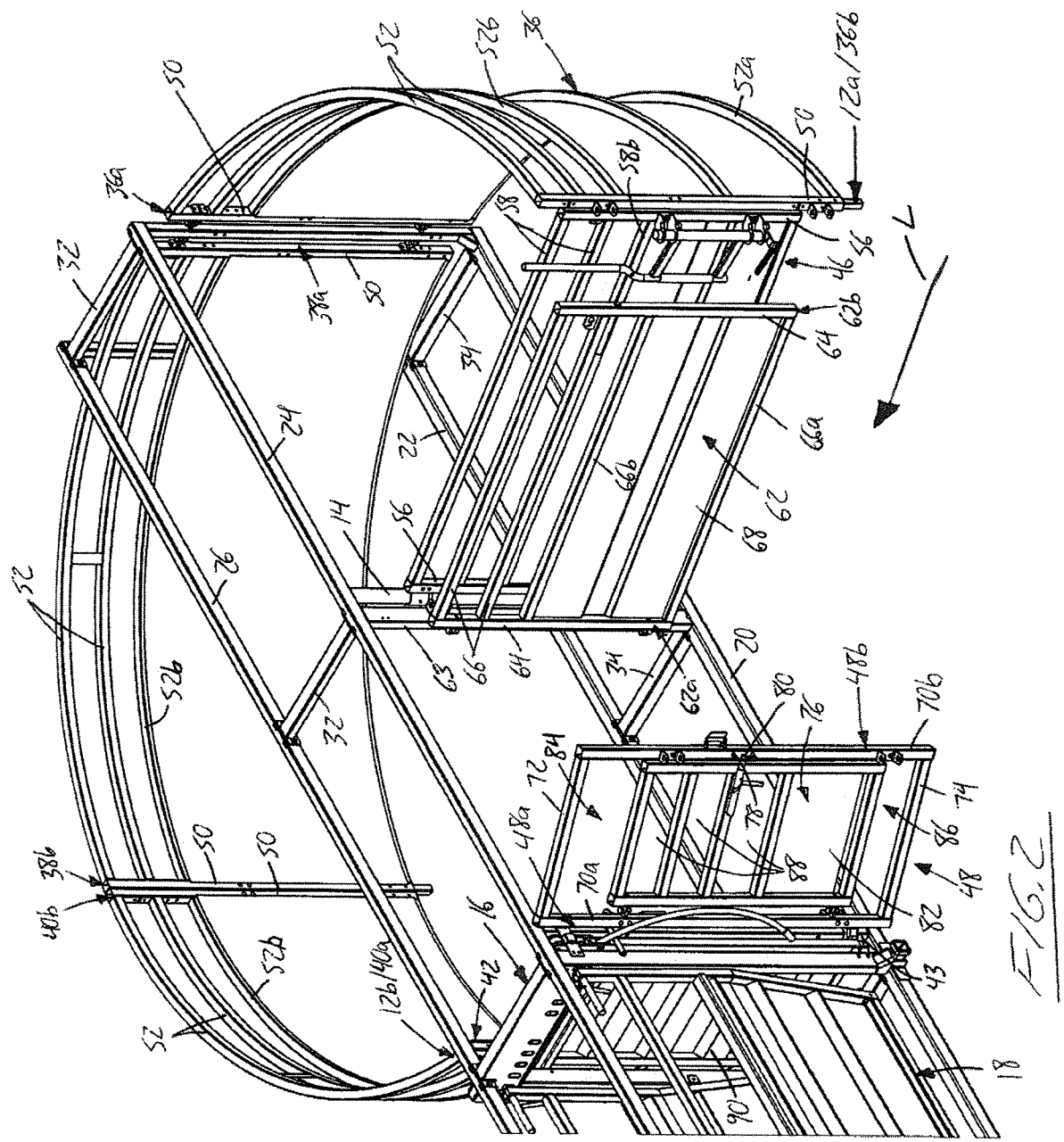
FIG. 2 is an overhead perspective view of the force tub of FIG. 1 from an opposing second side thereof.
Figure 3:
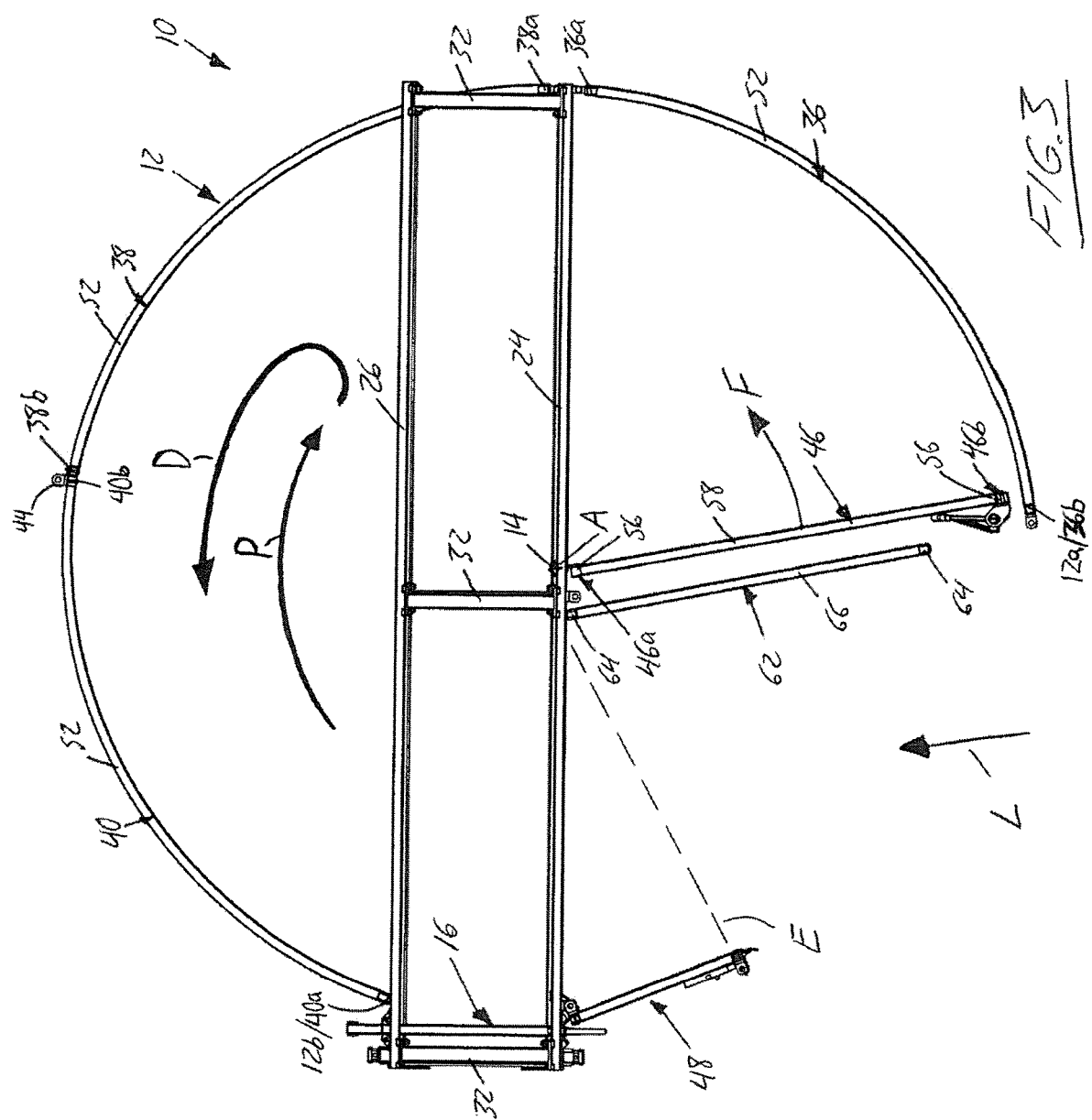
FIG. 3 is an overhead plan view of the force tub of FIGS. 1 and 2.
Figure 4:
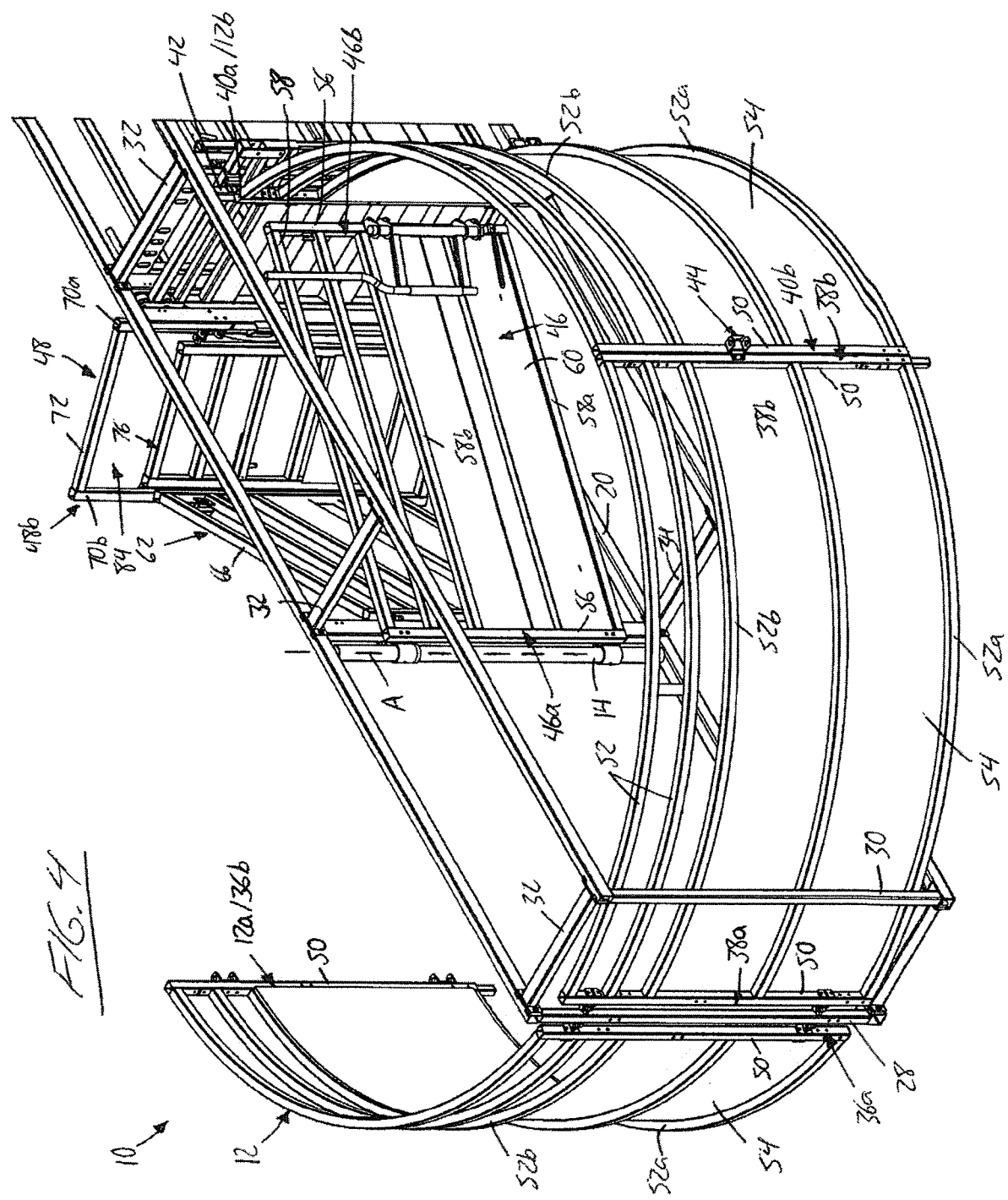
FIG. 4 is an overhead perspective view of the force tub of FIG. 1, but in a final unloading state after having encouraged livestock into a connected alleyway.
Figure 5:
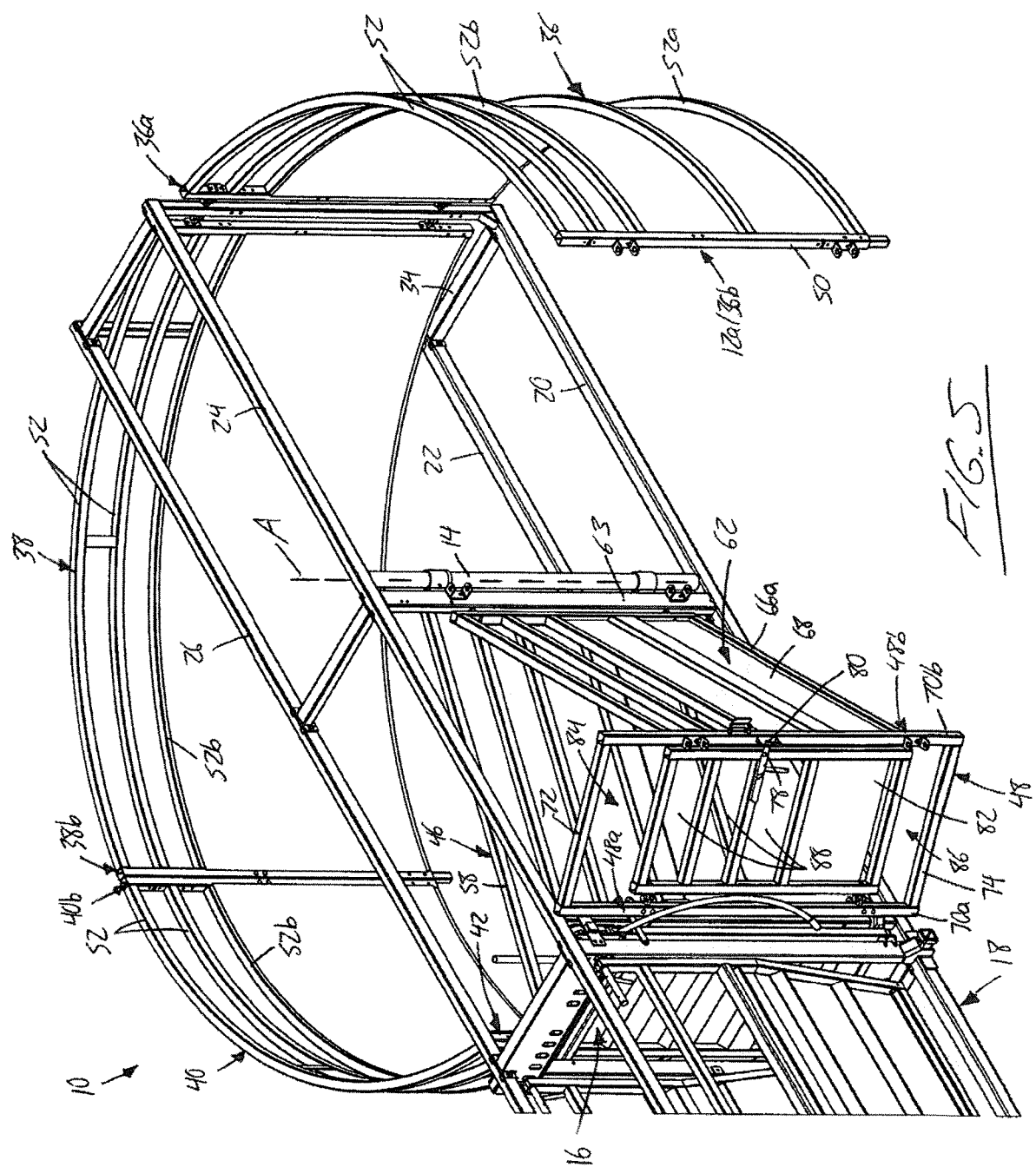
FIG. 5 is an overhead perspective view of the force tub of FIG. 4 from the opposing second side thereof.
Figure 6:
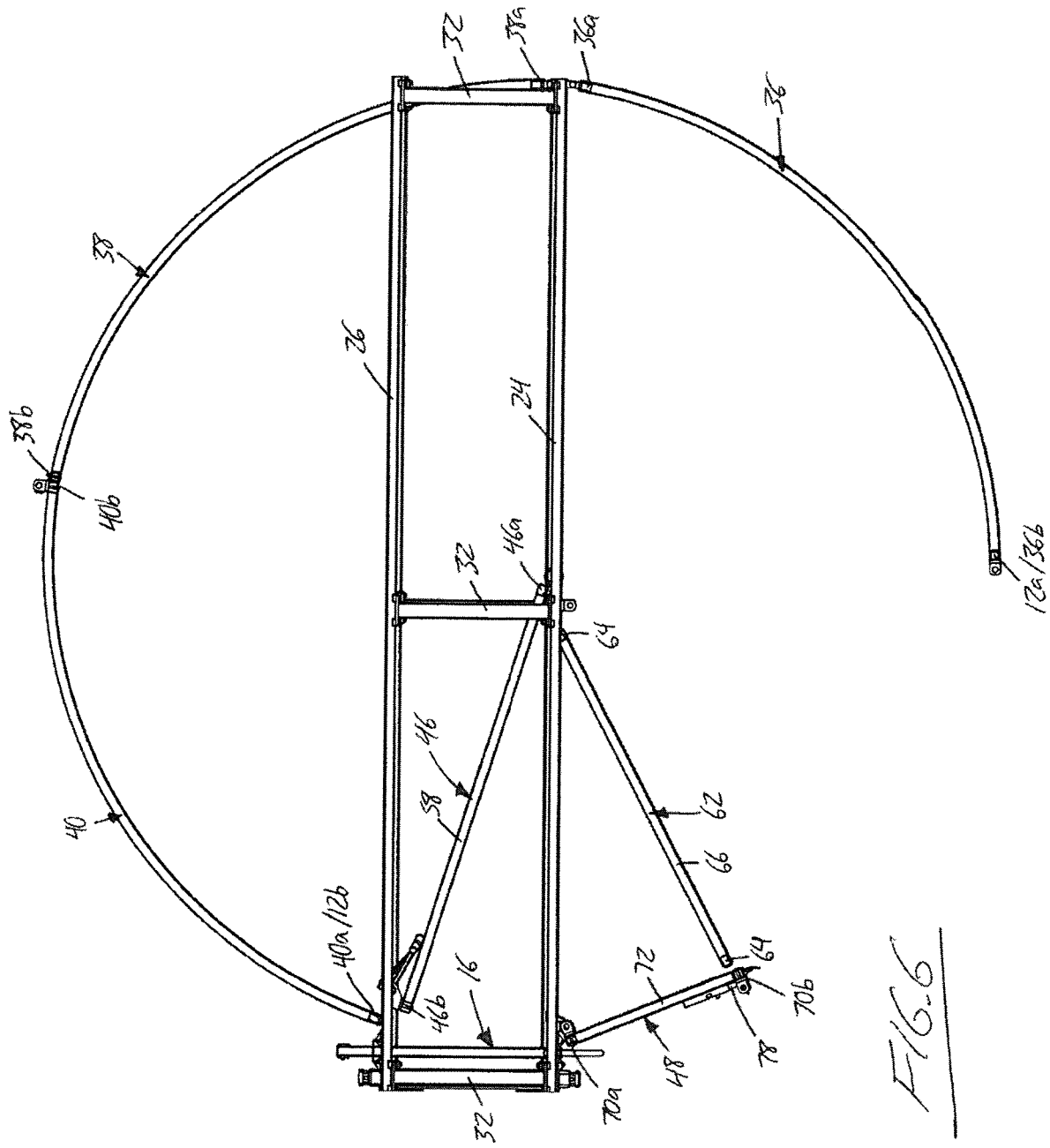
FIG. 6 is an overhead plan view of the force tub of FIGS. 4 and 5.

A movable barrier panel 46 stands upright between the center post 14 and the concave inner side of the peripheral wall 12 in a vertical plane emanating radially outward from the central axis A. An inner end 46a of the barrier panel 46 situated adjacent the center post 14 is rotatably coupled thereto to enabling swinging of the barrier panel around the central upright axis A. An opposing outer end 46b of the barrier panel resides closely adjacent the concave inner side of the peripheral wall, and travels closely therealong during the swinging movement of the barrier panel around the central upright axis A. FIGS. 1 to 3 show the barrier panel at a starting point of its working stroke, where the outer end 46b of the barrier panel resides closely adjacent the starting end 12a of the peripheral wall 12. The movable barrier panel 46 is swingable along the full length of the peripheral wall 12 to an end point of its working stroke in which the outer end 46b of the barrier panel 46 resides closely adjacent the terminal end 12b of the peripheral wall at the side of the exit 16 to which the third wall section 40 is coupled.

A supplemental wall section 48 has a proximal end 48a thereof hinged to another upright frame member 43 on the side of the exit 16 opposite the third peripheral wall section 40. This supplemental wall section 48 has a lesser width than the movable barrier panel 46, and also a lesser width than any of the peripheral wall sections 36, 38, 40. This supplemental wall section 48 instead is more comparable in width to the exit 16 of the force tub, which is wide enough only to admit a single animal at a time into the alleyway 18. In the deployed position shown in the drawings, the supplemental wall section 48 reaches laterally outward from the exit 16, thus forming a continuation of the force tub's main peripheral wall in a generally circumferential direction around the central axis A. As illustrated, the supplemental wall section 48 may be flat rather than arcuately curved, and thus may lie tangentially of the circular path followed by the main peripheral wall 12 rather than lying in truly arcuate conformance with said circular path. The circumferential direction of the supplemental wall section's deployed position thus refers only to the notion that it lies more circumferentially than radially of the central axis, and not to specifically denote adherence to a circular or arcuate path around the central axis A. Like the main peripheral wall sections 36, 38, 40, the supplemental wall section 48 is foldable inwardly from its deployed position to transition the force tub into its collapsed transport state, during which the supplemental wall section 48 is thus pivoted inwardly toward the diametral plane occupied by the central upper and lower beams 20, 24 of the tub framework.

The main peripheral wall 12, the supplemental wall section 48 and the exit 16 disposed therebetween collectively define a perimeter structure spanning a partial circle around the central axis A of the force tub to delimit a sector-shaped interior space thereof that spans less than 360-degrees, but preferably 180-degrees or more, around the central axis from a radial plane that spans from the central axis A to the distal end 48b of the supplementary wall section, to a radial plane that spans from the central axis A to the starting end 12a of the main peripheral wall 12 furthest from the exit 16. The starting end 12a of the main peripheral wall, as defined by the distal end 36b of the first peripheral wall section 36, thus defines one end of the overall perimeter structure, the opposing end of which is defined by the distal end 48b of the supplementary wall section.

Each main peripheral wall section 36, 38, 40 has a skeletal frame with upright outer posts 50 defining the proximal and distal ends of the section, and a series of arcuately curved rails 52 spanning horizontally between the outer posts 50 at varying heights thereon. Lower cladding 54 spans a majority height of each curved peripheral wall section 36, 38, 40 from a lowermost rail 52a thereof situated near ground level to a higher rail 52b situated nearer the top end of the section. This lower cladding 54 thereby leaves only a minor fraction of the wall section's height uncladded at a skeletal upper portion thereof. The main peripheral wall is thus cladded over a majority of its height, whereby the lower cladding protects personnel outside the force tub from cattle or livestock therein, while the shorter skeletal upper portion still provides some sightline into the interior space of the tub from overtop the cladded lower portion.

The movable barrier panel 46 similarly has a cladded skeletal frame with outer posts 56 defining the respective ends of the barrier panel and horizontal rails 58 spanning therebetween at varying heights thereon, though the illustrated barrier panel is flat, not curved, and thus uses straight rails rather than the curved rails of the main peripheral wall sections. Lower cladding 60 again spans a majority of the barrier panel's height from a near-ground lower rail 58a to a higher rail 58b situated nearer the top end of the movable barrier, while an uncladded skeletal upper portion resides above the cladded lower portion to enable viewing of the force tub interior through this upper portion of the barrier 46.

A movable closure gate 62 has inner end 62a thereof pivotally mounted to a gate support post 63 that stands vertically upright between the upper and lower center beams 24, 20 beside the center post 14. This enables pivotal motion of the closure gate 62 into and out of a closed position spanning between the gate support post 63 and the deployed position of the supplemental wall section 48. The distal end 48b of the deployed supplemental wall section 48 receives the outer end 62b of the movable closure gate 62 in the closed position thereof, and cooperating latch components are provided on the distal end 48b of the supplemental wall section 48 and the outer end 62b of the movable closure gate 62 to securely couple same together in this closed position of the closure gate. Alternatively, rather than have the closure gate 62 pivotally supported to the framework of the force tub near the central axis thereof for selective latched coupling to the supplementary wall panel 48 in the closed position, the closure gate 62 could instead be pivotally supported at the distal end 48b of the supplementary wall section 48b and swingable thereon into a closed position selectively latched to the center post 14 or gate support post 63 at or near the center of the force tub.

In either case, the closure gate 62 is operable to selectively close off an entrance opening of the force tub that is defined between the distal end 48b of the deployed supplemental wall section 48 and the gate support post 63 positioned closely adjacent the center axis A. The closure gate 62 is of similar construction to the movable barrier panel 42, having a cladded skeletal frame with outer posts 64 defining the respective ends of the closure gate and straight horizontal rails 66 spanning therebetween at varying heights thereon. Lower cladding 68 again spans a majority of the closure gate's height from a near-ground lower rail 66a to a higher rail 66b nearer the top end of the closure gate, while an uncladded skeletal upper portion resides above the cladded lower portion to enable viewing through this upper portion of the gate.

The supplemental wall section 48 features a rectangular outer frame having first and second upright side posts 70a, 70b that respectively define the proximal and distal ends 48a, 48b of the supplementary wall section, a top header 72 spanning horizontally between the side posts 70a, 70b at the top ends thereof to define the top end of the supplementary wall section 48, and a footer 74 spanning horizontally between the side posts 70a, 70b at the bottom ends thereof to define the bottom end of the supplementary wall section 48. Within the rectangular opening bound by this outer frame, the supplementary wall section 48 features an inner gate 76 pivotally hung from the first side post 70a which, in turn, is pivotally hung beside the exit 16 on frame member 43 thereof. The inner gate 76 is movable between a closed position occupying the opening of the outer frame to obstruct passage therethrough, and an open condition withdrawn from the opening of the outer frame to enable passage therethrough. A latching mechanism having cooperating components on the inner gate and outer frame is operable to lock the inner gate in the closed condition, and for example employs a sliding lock bolt 78 on the inner gate 76 that cooperates with an aligned lug 80 on the second side post 70b of the outer frame.

The inner gate 76 has a skeletal structure of the same partially cladded type described for the closure gate 62 and the movable barrier 46, except that the cladding 82 on the lower section of the inner gate 76 is of lesser height than the uncladded skeletal upper portion of the inner gate. The top edge of the cladding 82 on the lower section of the lower gate is situated at a lesser elevation than the top edges of the cladding on the closure gate and the movable barrier panel, which as shown may reside at lower elevation that the top edge of the lower cladding 54 of the main peripheral wall sections 36, 38, 40. As shown, open space 84 may be left between the top end of the inner gate 76 and the header 72 of the outer frame, with another open space 86 optionally left between the bottom end of the inner gate 76 and the footer 74 of the outer frame.

Accordingly, a number of unoccupied openings reside in the supplementary wall section 48, for example including unoccupied window openings 88 between rails of the inner gate 76 above the cladded lower section thereof, and unoccupied areas 84, 86 of the outer frame's inner opening above and below the closed inner gate 76. As a result of this, the supplementary wall panel 48 is opaquely cladded over a lesser fraction of its overall area than any of the more significantly cladded closure gate 62, movable barrier 42 and main peripheral wall 12. That is, a majority of each of the closure gate 62, movable barrier 42 and main peripheral wall 12 is opaquely cladded in a manner preventing light admission and visibility therethrough, whereas only a minority of the supplementary wall section 48 is cladded, for example only on the inner gate 76 thereof, while the majority of the supplementary wall section 48 is instead of open skeletal structure leaving significantly open areas 84, 86, 88 for light transmission and visibility through the supplementary wall section. The supplemental wall section 48 is thus of reduced relative opacity compared to the remainder of components bordering respective areas of the force tub interior.

In a conventional manner, side panels of the alleyway have solid cladding occupying a substantial fraction, for example approximately half, of the alleyway's height, and thus like the main peripheral wall, closure gate and barrier or the force tub have a greater opacity than the less cladded supplementary wall section.

Having described the structure of the force tub, attention is now turned to its operation. FIGS. 1 through 3 show the force tub in an initial loading state ready for the admission of livestock animals thereto through the entrance opening described above, and denoted by broken line E in FIG. 3. In this loading state, the closure gate 62 resides in an open position swung out of the entrance opening into adjacent and generally parallel relation to the movable barrier panel 46, which resides at the starting point of its working stroke, thus spanning radially from the center of the force tub to the starting end 12a of the main peripheral wall 12. Cattle are herded through the entrance opening into the force tub in loading direction L. The livestock continue in this direction past the exit 16, where a sliding door 90 is initially maintained in a closed position obstructing exit 16 during the loading procedure. The entering livestock thus bypass the exit and continue on a curved path P around the central axis A of the force tub, as guided by the main peripheral wall. Once a number of livestock have entered the force tub through entrance opening E, the closure gate 62 is closed across the entrance opening E, thus preventing exit of the already admitted livestock back through the entrance opening E. At this point, the exit door 90 can be opened. As livestock still moving in path direction P approach the starting end 12a of peripheral wall and see that exit from this location is prevented by the movable barrier 46, some livestock will hopefully follow a natural inclination to turn around and begin travelling in an unloading direction D back toward the entrance opening E. Further encouragement of the admitted livestock in unloading direction D is provided by an operator forcing the moveable barrier panel 46 in this same unloading direction D around the central axis, as shown by arrow F of FIG. 3.

So far, the forgoing procedure follows that used in Applicant's aforementioned Budflow force tub. The novel presence of a reduced opacity supplementary wall section 48 in a position adjacent the exit 16 on the side thereof opposite the terminal end 12b of the main peripheral wall 12 adds additional enticement of the admitted livestock in direction D back toward the exit 16, as the decreased opacity of this supplemental wall section 48 introduces more light into the area of the force tub bound thereby than is admitted (a) at the force tub areas bound by the more significantly cladded main wall sections 36, 38, 40 and (b) inside the alleyway by the more significantly cladded side panels thereof. The reduced opacity of the supplementary wall section 48 and also provides the confined livestock with a visible sightline of the external environment outside the force tub. The relatively well-lit condition and/or environmental visibility of this exit-adjacent area have been found to be more enticing to livestock than the relatively dark and enclosed remainder of the force tub and connected alleyway, thus helping draw the livestock in direction D toward exit 16. By having the closure gate 62 significantly more cladded than the supplementary wall section 48, the direction of attraction leads the livestock more toward exit 16 than toward the entrance opening E.

With reference to FIG. 10, the supplementary wall section 48 also adds another novel and useful characteristic to the force tub, regardless of whether or not said supplementary wall section 48 is of reduced opacity to the other wall sections. The supplementary wall section 48 creates an extension of the typical interior space of a force tub, which is helpful to minimize disruptions to successful livestock flow through the tub and into the connected alleyway.

Figure 10B:
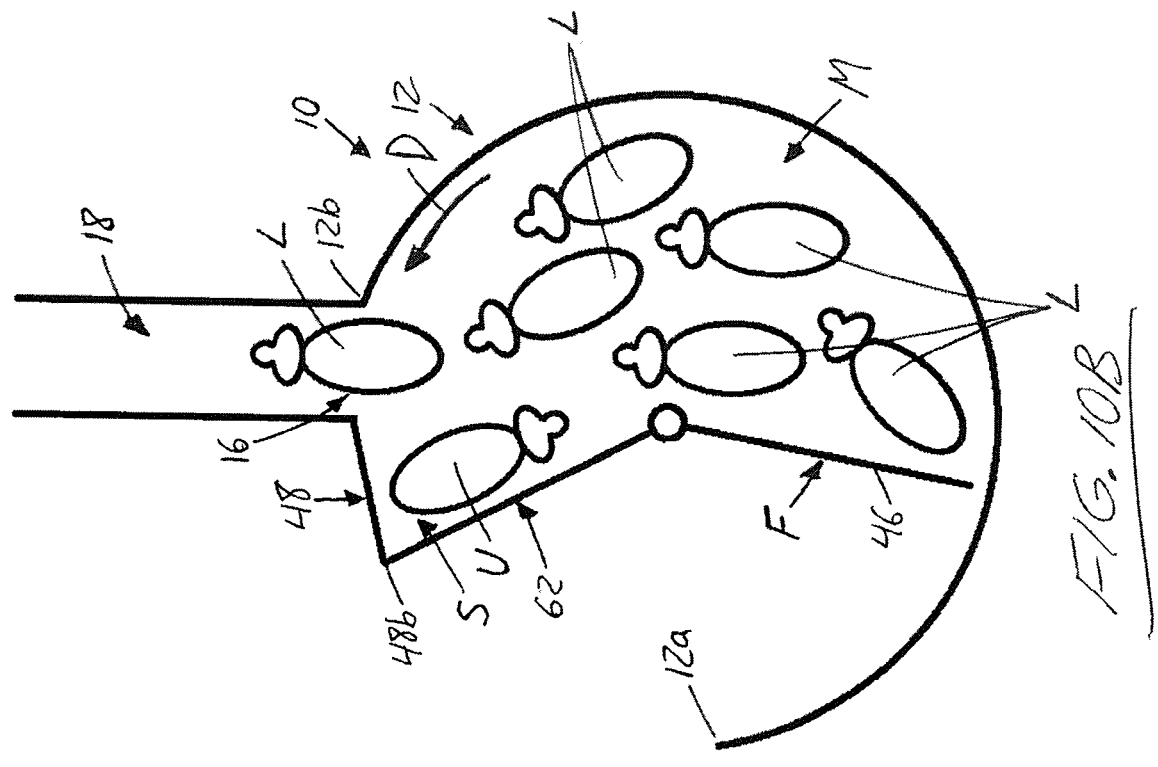
FIG. 10B is a schematic overhead plan view of the inventive force tub of FIG. 1 or 7, illustrating how a supplemental wall section thereof creates an auxiliary space to accommodate the uncooperative animal in non-obstructive relation to the exit.
Figure 10A:
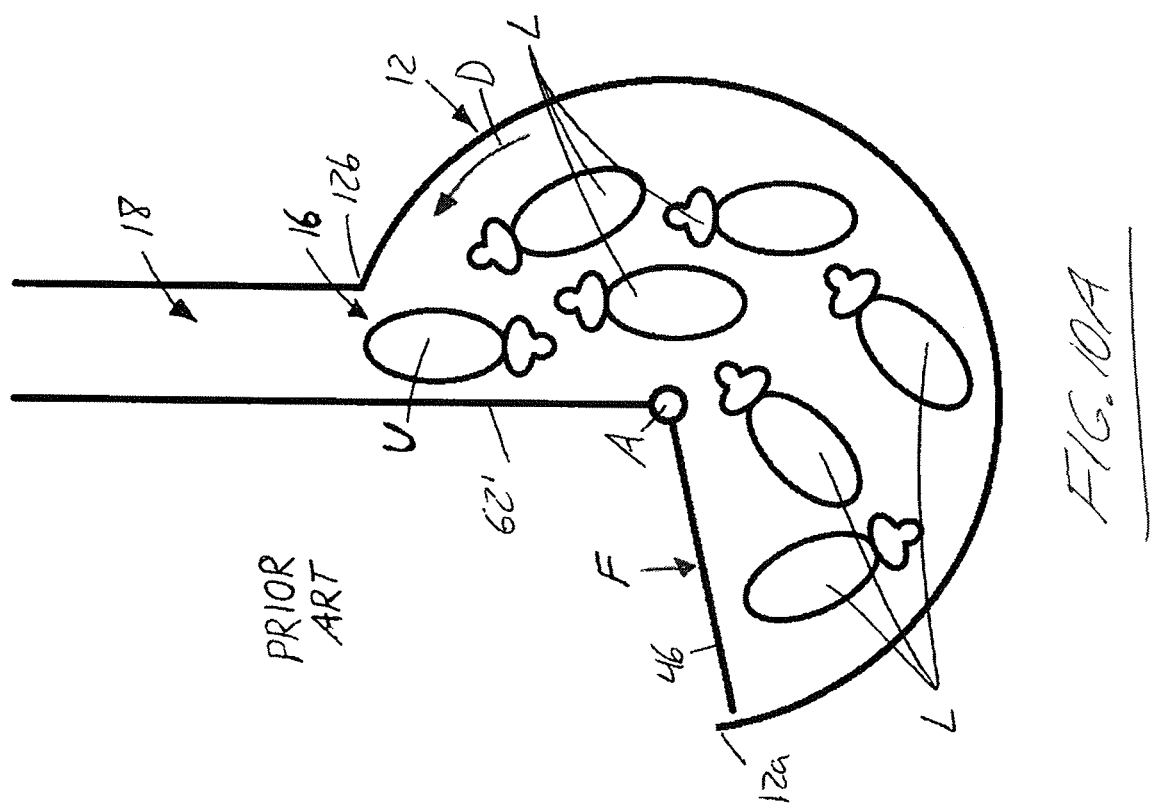
FIG. 10A is a schematic overhead plan view of a conventional force tub, illustrating flow-interruption by an uncooperative animal obstructing the exit of the force tub.

In a conventional force tub, shown in FIG. 10A, the interior space does not extend beyond the exit 16 in its angular span around the central axis A in the unloading direction D in which the movable barrier 46 is swung to herd the livestock through the exit 16. Instead, the interior space is terminated by a closure 62' that resides in a radial plane that spans from the central axis A to the side of the exit 16 opposite the main peripheral wall section 12, whereby the closure 62' resides in immediately adjacent relation to the exit 16.

In the present invention, shown in FIG. 10B, the closure gate 62 does not reside in immediate adjacency to the exit 16, and instead terminates the interior space at a distance outward from the exit 16 at a radial plane that spans from the central axis A to the distal end 48b of the supplemental wall section 48. This increases the angular span of the interior space around the central axis so the interior space extends angularly beyond the exit 16 in the unloading direction D. The enlarged interior space in the present invention therefore includes a majority space M spanning angularly around the central axis from the starting end 12a of the main perimeter wall to the radial plane immediately adjacent the exit 16 where the conventional force tub is terminated, plus an extra sector-shaped auxiliary space S spanning beyond the exit 16 to the distal end 48b of the supplemental wall section 48.

As shown through comparison of FIGS. 10A and 10B, this extra auxiliary space S improves traffic flow by accommodating the possibility of an uncooperative animal U that either stubbornly refuses to enter the alley, or has found itself facing the wrong direction away from the exit 16 and connected alleyway 18. As shown in FIG. 10A, in a conventional force tub, a singular uncooperative animal U refusing or facing away from the exit 16 can prevent other livestock L from accessing the exit 16 and alleyway 18. In the present invention, shown in FIG. 10B, urging of the cooperative livestock toward the exit 16 with the movable barrier 46 forces the uncooperative animal U into the auxiliary space S located past the exit 16, and so the remaining cooperative livestock L can bypass the uncooperative animal and successfully reach the exit 16 and connected alleyway 18. The above described inner gate of the supplemental wall section 48 enables access to this remaining uncooperative animal U within the auxiliary space S if necessary, without opening the larger closure gate 62 and risking escape of the animal from the force tub.

Figure 7:
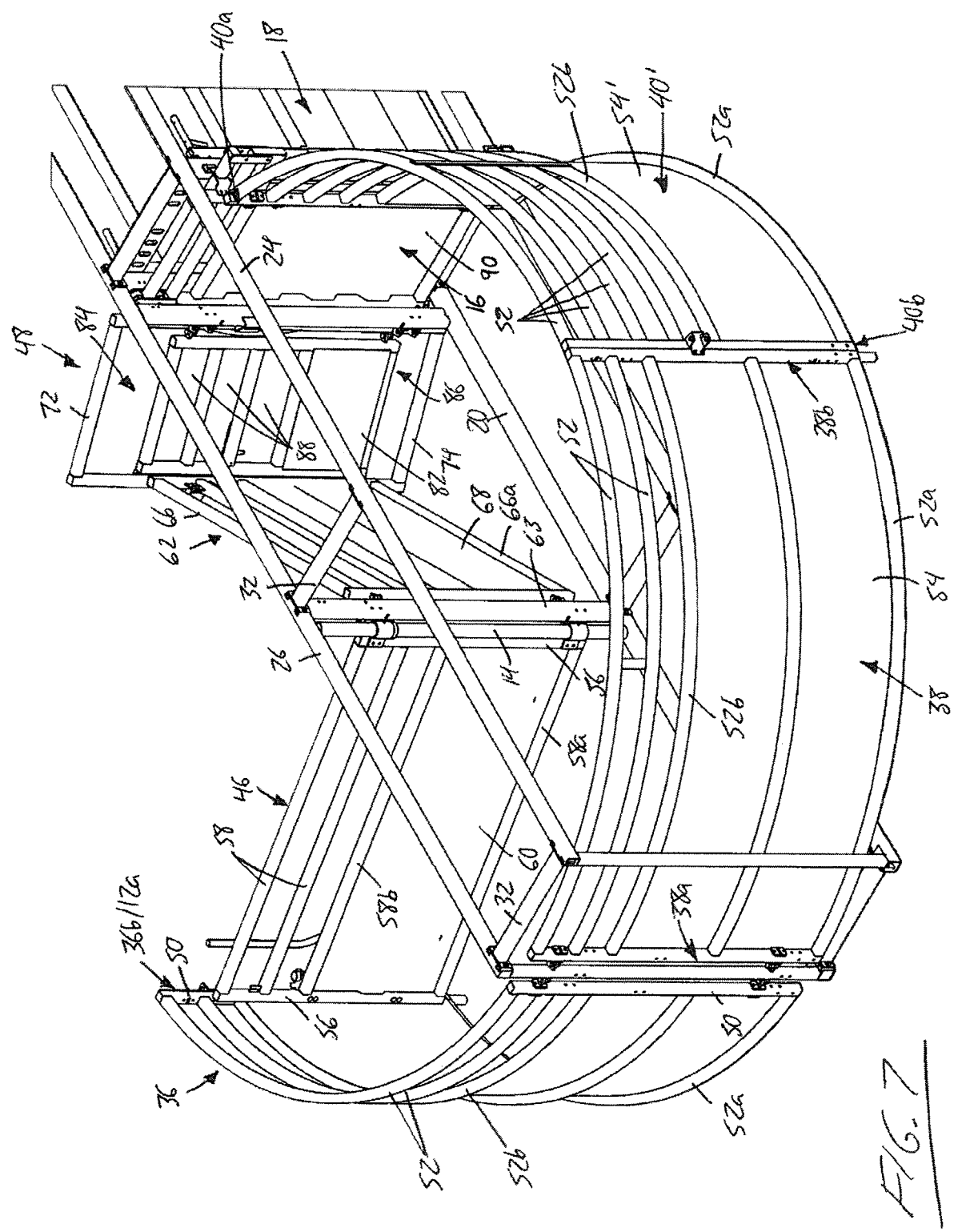
FIG. 7 is an overhead perspective view of a force tub according to a second embodiment of the present invention, as viewed from the first side thereof in an intermediate state between loading and unloading.
Figure 8:
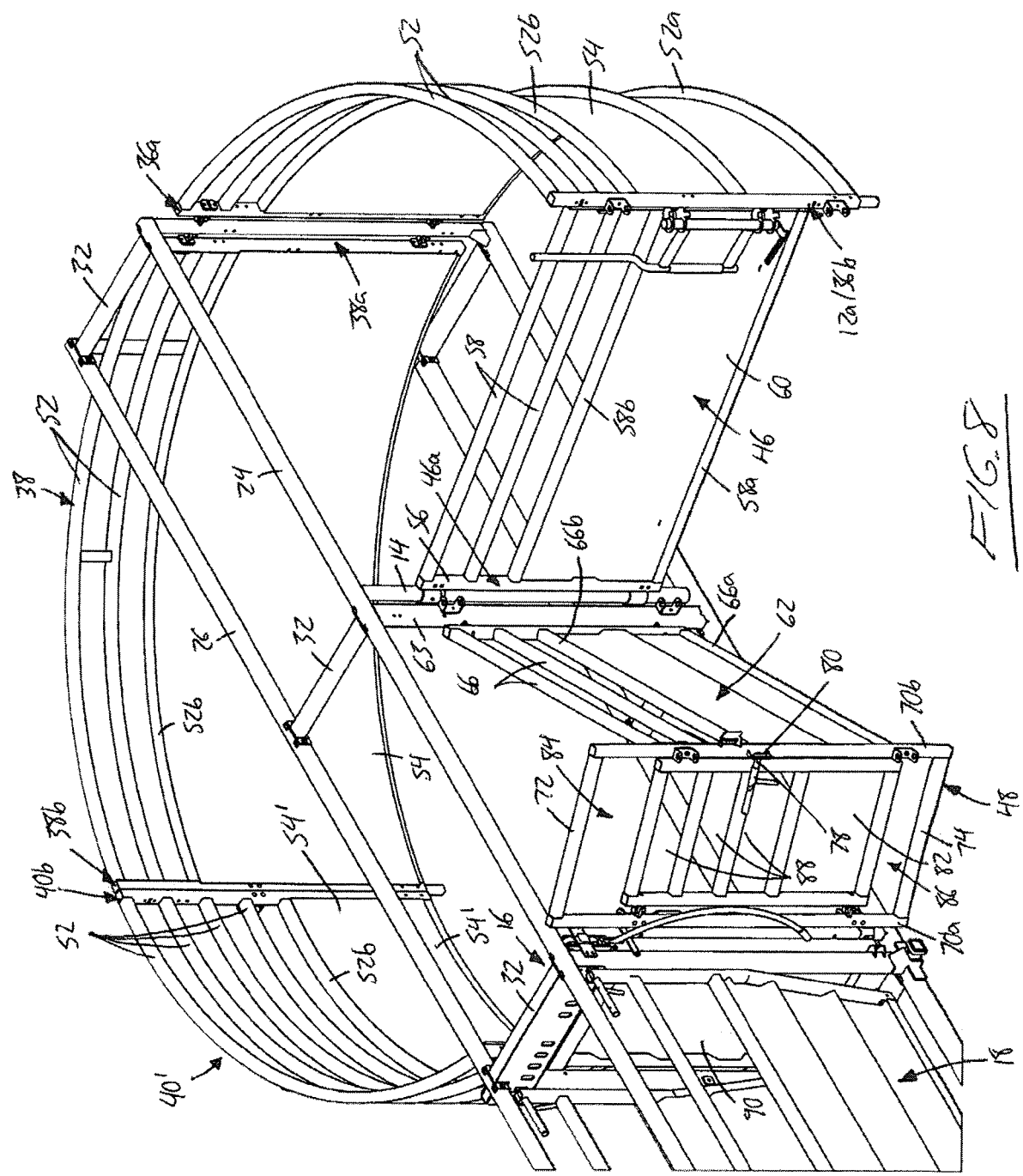
FIG. 8 is an overhead perspective view of the force tub of FIG. 7 from the opposing second side thereof.
Figure 9:
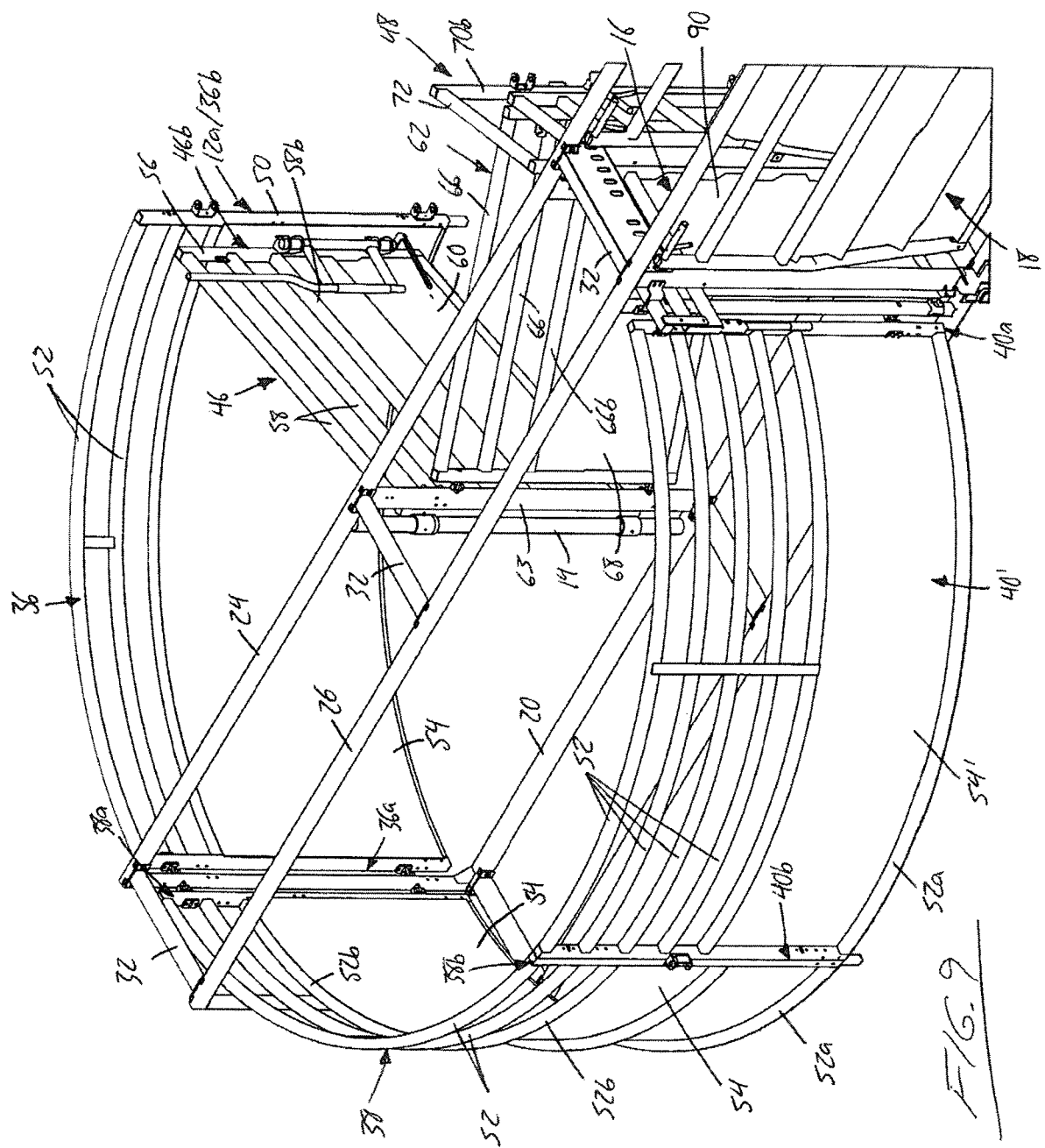
FIG. 9 is an overhead perspective view of the force tub of FIG. 8 from a third side thereof.

FIGS. 7 through 9 illustrate a second embodiment that differs from the first only in that the third peripheral wall section 40', while equal in overall height to the first and second peripheral wall sections 36, 38, is cladded over a shorter fractional height. The reduced lower cladding 54' of the third peripheral wall section 40' thus leaves a larger uncladded skeletal portion through which more light admission and environmental visibility is achieved compared to the more significantly cladded first and second peripheral wall sections 36, 38.

Since this third wall section 40' defines the terminal end 12b of the main peripheral wall 12, it is also referred to herein as the terminal wall section 40', and therefore directly neighbours the exit 16, whereby the reduced opacity of this lesser cladded terminal wall section 40' relative to the more significantly cladded first and second wall sections 36, 38 serves the same purpose of the supplemental wall section's reduced opacity, i.e. to visually draw the livestock toward the exit 16 of the force tub. This second embodiment thus uses reduced opacity wall sections on both sides of the exit 16 to draw the livestock theretoward, rather than reduced wall opacity on only one side of the exit, like the first embodiment. As shown, the reduced cladding 54' of the third wall section 40' is preferably also shorter than the cladding 60, 68 on the movable barrier 46 and the closure gate 62. Accordingly, the areas of the force tub's interior bordered by the terminal wall section 40' and the supplemental wall section 48 are more well lit and more environmentally exposed than the darker areas bound by the more significantly cladded first and second wall sections 36, 38 and by the closure gate 62 and movable barrier 46, thus visually encouraging the livestock toward the exit 16 that is neighboured on both sides by the reduced opacity wall sections 40', 48. In addition, since the reduced opacity terminal wall section 40' resides in opposing relation to the entrance opening E, the increased light admission and environmental visibility helps encourage them into the tub during initial loading.

As shown, the reduced opacity terminal wall section 40' may employ a greater number of curved horizontal rails 52 than the more significantly cladded first and second wall sections 36, 38. The illustrated terminal wall section 40 employs the same rail-to-rail vertical spacing at its taller skeletal upper portion as the shorter skeletal upper portions of the more significantly cladded first and second wall sections 36, 38, thereby achieving a balance between protection of surrounding personnel, and increased light admission and environmental visibility.

FIGS. 11 and 12 illustrate another force tub of the same general type illustrated in FIGS. 8 and 9, and demonstrate that the closure panel 62, in addition to being securable to the distal end of the supplemental wall section 48 in a first closed position spanning across the entrance opening E (as shown in FIGS. 4-9, 10B and 12 to create the auxiliary space S, is also securable in a second closed position secured to the same upright frame member 43 to which the supplementary wall section is hinged at one side of the exit, as shown in FIG. 11. In FIG. 11, the closure panel 62 occupies an equivalent position to the conventional closure 62' of FIG.

10A, thus eliminating the extra auxiliary space S and limiting the interior space of the force tub to a conventional size and shape. FIG. 12A illustrated how a latch bolt 80 at the outer end 62b of the movable closure gate 62 is selectively engageable with a first latch plate 82a at the distal 48b end of the supplementary wall section 48 to secure the closure panel 62 in the first closed position, while FIG. 12B shows how the same latch bolt 80 is also selectively engageable with a second latch plate 82b on the upright frame member 43 of the exit 16 to secure the closure panel 62 in the second closed position.

By enabling secured closure of the closure panel in either of these two positions, after having admitted the livestock through the entrance opening, the owner/operator of the force tub is given the ability to choose between a conventional tub shape without the extra auxiliary space S, or inventive tub shape that incudes this extra auxiliary tub space beside the exit. Such selection from among these two closure positions may, for example, be based on the type of livestock concerned, where young calves may tend to gather in the auxiliary space S in numbers crowding and obstructing the exit, in which case the second closed position adopting a conventional tub shape may be more helpful than when dealing with more mature livestock. Spatial constrains of the given environment and other nearby equipment may also be a factor in choosing between the smaller conventional tub shape, versus the larger inventive tub shape. It will be appreciated that in the second closed position limiting the interior space to the conventional shape, not only is the extra auxiliary space eliminated, but the visibility of the reduced-opacity supplementary wall section 48 is also obstructed by the closure panel, which may also contribute to reducing potential calf crowding in front of the exit.

While the illustrated embodiments employ a configuration like Applicant's Budflow force tub where the entrance opening E is near the exit 16 and the livestock are therefore loaded into the force tub in a loading direction L opposite to the unloading direction D back through the exit, it will be appreciated that the use of one or more reduced opacity wall sections adjacent the exit to visually entice the livestock toward the exit may also be used in more conventional force tub layouts where the livestock enter and exit the force tub in the same clockwise or counter-clockwise direction around the central axis. In such layouts, instead of an entrance opening that is situated beside the exit and is openable/closeable via a closure gate that is separate from the movable barrier, the livestock are instead introduced into the force tub by using the movable barrier panel as a loading gate that when swung past the starting end of the main peripheral wall, reveals an entrance opening that is instead situated at a radial plane spanning from the central axis A to the starting end 12a of the main peripheral wall 12. In such embodiments, the closure 62 is left in a static position throughout the loading and unloading process, and thus is not used as a gate, though it may still be pivotally mounted at one end selectively latchable at the other to enable swinging of the closure between deployed and retracted states for optional collapse and expansion of the force tub for mobile applications.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A livestock force tub comprising:
   a perimeter structure delimiting an interior space of said livestock tub, said perimeter wall structure comprising:
      a main peripheral wall standing upright in a position spanning partially around said interior space in a circumferential direction around a central upright axis from a starting end of said main peripheral wall to an opposing terminal end thereof; and
      an exit situated at or proximate said terminal end of said main peripheral wall to enable exit of livestock from said interior space; and
      a supplemental wall section standing upright at an area adjacent the exit on a side thereof opposite the terminal end of said main peripheral wall and nearest the starting end thereof, said supplemental wall section having a proximal end that is secured in adjacency to said exit at said side thereof, and a distal end that resides opposite of said proximal end, and said supplemental wall section being positioned or positionable in a working position spanning laterally outward from the exit in non-obstructing relation thereto toward the starting end of the main peripheral wall;
   an entrance through which livestock are admissible to the interior space of said force tub;
   a closure residing in, or moveable into, a secured position in which the closure is in secured connection with the supplement wall section, in the working position thereof, at a location on said supplemental wall section that is situated distally of the proximal end thereof, and in which the closure thereby closes off the interior space of the force tub in non-obstructive relation to the exit on a side of the supplementary wall section opposite the exit; and
   a movable barrier supported for rotational movement around the central upright axis at an inner end thereof and reaching outwardly away from said central axis toward the main peripheral wall to enable swinging of an opposing outer end of said movable barrier along an interior side of said main peripheral wall toward the terminal end thereof to encourage livestock toward the exit.

2. The livestock force tub of claim 1 wherein said entrance comprises an entrance opening situated between the supplemental wall section and the central upright axis, and the closure is a movable closure gate supported for movement between a closed position, which coincides with said secured position and obstructs said entrance opening, and an open position that reveals said entrance opening.

3. The livestock force tub of claim 2 wherein said movable closure gate is pivotally supported for pivotal movement about an upright pivot axis between said open and closed positions.

4. The livestock force tub of claim 3 wherein said movable closure gate is pivotally connected at an inner end thereof to an upright gate support positioned at or adjacent the central upright axis of the force tub.

5. The livestock force tub of claim 1 wherein the supplemental wall section is of lesser width than the movable barrier.

6. The livestock force tub of claim 1 wherein the supplemental wall section is of lesser width than the closure.

7. The livestock force tub of claim 1 wherein the supplemental wall section is movably supported for movement between said working position, in which the supplemental wall section resides in generally circumferential relation to the upright central axis, and a stowed transport position swung inwardly from the working position further into the interior space of the tub and into an orientation lying more radially than circumferentially of the upright central axis.

8. The livestock force tub of claim 1 wherein the supplemental wall section comprises an outer frame and an openable/closeable inner gate movably supported on the outer perimeter frame for movement between a closed condition residing within an opening of the outer frame to obstruct passage therethrough, and an open condition withdrawn from the opening of the outer frame to enable passage therethrough.

9. The livestock force tub of claim 1 wherein the supplemental wall section is of lesser opacity than more opaquely cladded sections of the main peripheral wall that reside further from the exit than said supplemental wall section, and is also of lesser opacity than the closure, whereby light admission into the interior space from an external environment and visibility of the external environment from the internal space are greater at said supplementary wall section adjacent the exit compared to other areas of the interior space that are bordered by the by the closure and the more opaquely cladded areas of the main peripheral wall.

10. The livestock force tub of claim 9 wherein the opacity of the supplemental wall section is also of lesser opacity than the movable barrier.

11. The livestock force tub of claim 9 wherein:
the more opaquely cladded areas of said main peripheral wall comprise lower cladding thereon; and
the supplemental wall section comprises:
a cladded lower section of lesser height than said lower cladding of the more opaquely cladded areas of said main peripheral wall; and
an uncladded upper section that resides above the cladded lower section to provide or contribute to said light admission and visibility.

12. The livestock force tub of claim 11 wherein one or both of the movable barrier and the closure comprises additional lower cladding thereon, and the cladded lower section of the supplemental wall section is of lesser height than said additional lower cladding.

13. The livestock force tub of claim 12 wherein said additional lower cladding includes cladding on the movable barrier.

14. The livestock force tub of claim 12 wherein said additional lower cladding includes cladding on the closure.

15. The livestock force tub of claim 11 wherein said uncladded upper section of the supplemental wall section is of greater height than the cladded lower section thereof.

16. The livestock force tub of claim 11 in combination with a livestock alley leading from the exit of the livestock tub, said livestock alley having side walls with cladded lower portions of greater height than the cladded lower section of the supplemental wall section.

17. The livestock force tub of claim 9 in combination with a livestock alley leading from the exit of the livestock tub, said livestock alley having side walls of greater opacity than the supplemental wall section.

18. The livestock force tub of claim 9 in combination with a livestock alley leading from the exit of the livestock tub, wherein the supplemental wall section comprises a cladded lower section and an uncladded upper section that resides above the cladded lower section to provide or contribute to said light admission and visibility, and said livestock alley has side walls with cladded lower portions of greater height than the cladded lower section of the supplemental wall section.

19. The livestock force tub of claim 1 wherein the supplemental wall section comprises a skeletal structure having unoccupied openings therein through which said external light is admitted and said external environment is visible.

20. The livestock force tub of claim 1 wherein the main peripheral wall comprises a reduced opacity wall section residing adjacent the exit on a side thereof opposite the supplemental wall section, said reduced opacity wall section being of lesser opacity than more opaquely cladded sections of the main peripheral wall that reside further from the exit than said reduced opacity wall section, and also being of lesser opacity than the closure, whereby light admission into the interior space from an external environment and visibility of the external environment from the internal space are greater at an area adjacent the exit compared to other areas of the interior space that are bordered by the by the closure and the more opaquely cladded areas of the main peripheral wall.

21. The livestock force tub of claim 20 wherein the reduced opacity wall section is also of lesser opacity than the movable barrier.

22. The livestock force tub of claim 20 wherein said reduced opacity wall section is a terminal end section of the main peripheral wall that defines the terminal end thereof.

23. The livestock force tub of claim 20 wherein:
the more opaquely cladded areas of said main peripheral wall comprise lower cladding thereon; and
the reduced opacity wall section comprises:
a cladded lower section of lesser height than said lower cladding of the more opaquely cladded areas of said main peripheral wall; and
an uncladded upper section that resides above the cladded lower section to provide or contribute to said light admission and visibility.

24. The livestock force tub of claim 23 wherein one or both of the movable barrier and the closure comprises additional lower cladding thereon, and the cladded lower section of the reduced opacity wall section is of lesser height than said additional lower cladding.

25. The livestock force tub of claim 24 wherein said additional lower cladding includes cladding on the movable barrier.

26. The livestock force tub of claim 24 wherein said additional lower cladding includes cladding on the closure.

27. The livestock force tub of claim 23 wherein said uncladded upper section of the reduced opacity wall section is of greater height than the cladded lower section thereof.

28. The livestock force tub of claim 23 in combination with a livestock alley leading from the exit of the livestock tub, said livestock alley having side walls with cladded lower portions of greater height than the cladded lower section of the reduced opacity wall section.

29. The livestock force tub of claim 20 in combination with a livestock alley leading from the exit of the livestock tub, said livestock alley having side walls of greater opacity than the reduced opacity wall section.

30. The livestock force tub of claim 20 in combination with a livestock alley leading from the exit of the livestock tub, wherein the reduced opacity wall section comprises a cladded lower section and an uncladded upper section that resides above the cladded lower section to provide or contribute to said light admission and visibility, and said livestock alley has side walls with cladded lower portions of greater height than the cladded lower section of the reduced opacity wall section.

31. The livestock force tub of claim 20 wherein the reduced opacity wall section comprises a skeletal structure having unoccupied openings therein through which said external light is admitted and said external environment is visible.

32. The livestock force tub of claim 1 wherein the closure is movable into the secured position closing off the interior space of the force tub on the side of the supplementary wall section opposite the exit, and is also moveable into second secured position instead closing off the interior space of the force tub on the same side of the supplementary wall section as the exit, thereby reducing a size of the interior space.

33. The livestock force tub of claim 2 wherein the movable closure gate is also moveable into, and securable in, a second closed position reducing a size of the interior space of the force tub relative to the closed position that obstructs the entrance opening.

34. The livestock force tub of claim 1 wherein the supplemental wall section is configured at the distal end thereof for said secured connection with the closure.

35. The livestock force tub of claim 1 wherein the closure has an inner end and an opposing outer end, of which the inner end resides nearest to the central upright axis, and the outer end is configured for said secured connection with the supplemental wall section.

36. The livestock force tub of claim 1 wherein the closure has an inner end and an opposing outer end, of which the inner end resides nearest to the central upright axis, and the supplemental wall section and said closure are configured for said secured connection with one another at the proximal and outer ends thereof, respectively.

37. The livestock force tub of claim 1 comprising a framework on which the supplemental wall section and sections of the main peripheral wall are supported, said framework including upright frame members that reside on opposing sides of the exit and to which the supplemental wall section and the terminal end of the main peripheral wall are respectively attached.

38. The livestock force tub of claim 37 wherein said framework comprises a pair of parallel upper beams and a pair of parallel lower beams, and the upright frame members each span upright between a respective one of the upper beams and a respective one of the lower beams.

39. A livestock force tub comprising:
a perimeter structure delimiting an interior space of said livestock tub, said perimeter wall structure comprising:
 a main peripheral wall standing upright in a position spanning partially around said interior space in a circumferential direction around a central upright axis from a starting end of said main peripheral wall to an opposing terminal end thereof; and
 an exit situated at or proximate said terminal end of said main peripheral wall to enable exit of livestock from said interior space; and
 a supplemental wall section standing upright at an area adjacent the exit on a side thereof opposite the terminal end of said main peripheral wall and nearest the starting end thereof, said supplemental wall section having a proximal end that is secured in adjacency to said exit at said side thereof, and a distal end that resides opposite of said proximal end, and said supplemental wall section being positioned or positionable in a working position spanning laterally outward from the exit in non-obstructing relation thereto toward the starting end of the main peripheral wall;
an entrance through which livestock are admissible to the interior space of said force tub;
a closure having an inner end and an opposing outer end, of which the inner end resides nearest to the central upright axis, said closure residing in, or moveable into, a secured position in which the outer end of the closure is in secured connection with the distal end of the supplement wall section, in the working position thereof, and in which the closure thereby closes off the interior space of the force tub in non-obstructive relation to the exit on a side of the supplementary wall section opposite the exit; and
a movable barrier supported for rotational movement around the central upright axis at an inner end thereof and reaching outwardly away from said central axis toward the main peripheral wall to enable swinging of an opposing outer end of said movable barrier along an interior side of said main peripheral wall toward the terminal end thereof to encourage livestock toward the exit.

* * * * *